Aug. 21, 1962 W. N. SELLERS 3,049,809
METHOD OF DRYING FILAMENTARY MATERIAL
Original Filed Feb. 13, 1956
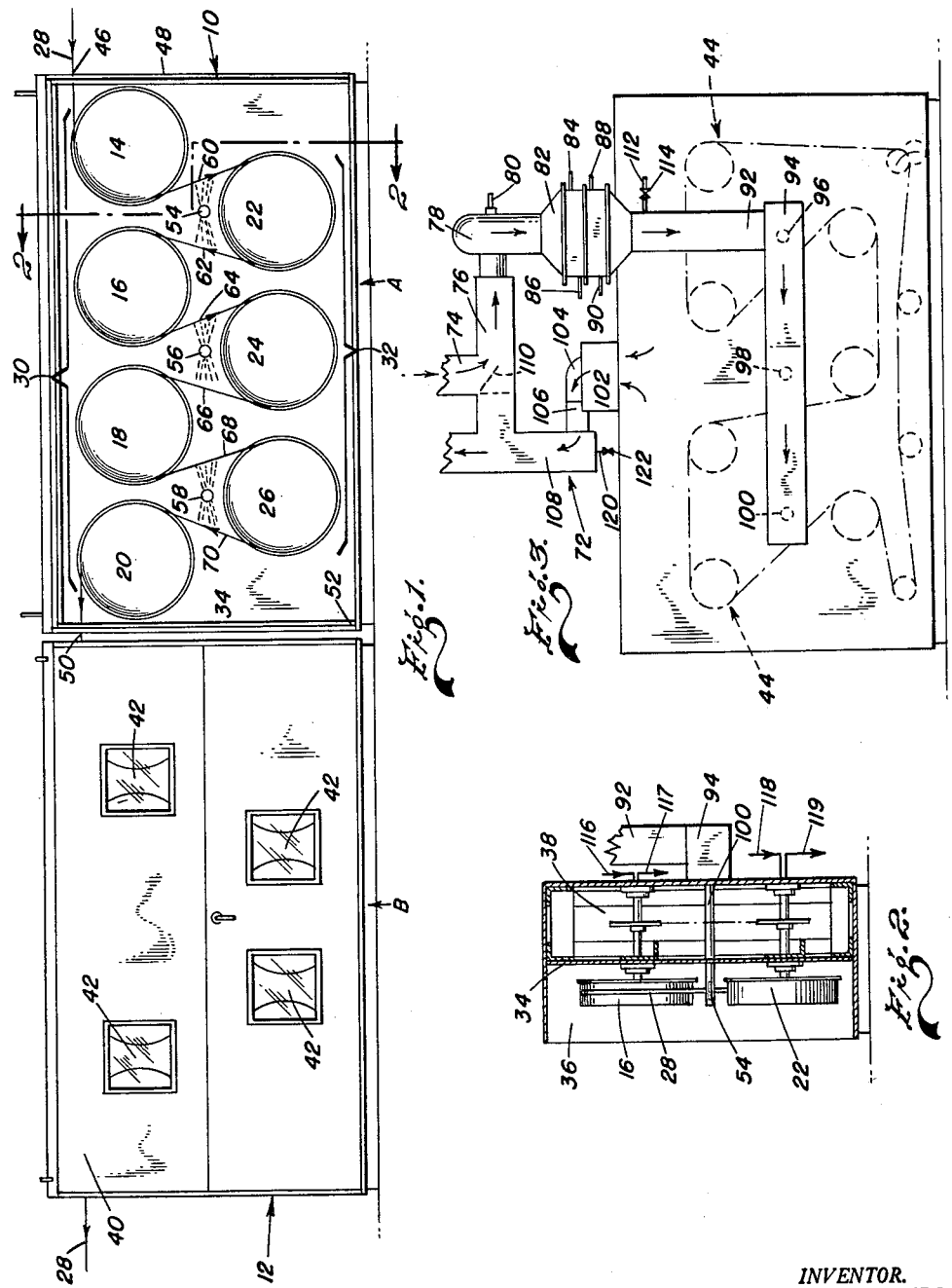
INVENTOR.
WILLIAM N. SELLERS,
BY
Harold L. Kauffman
ATTORNEY.

United States Patent Office 3,049,809
Patented Aug. 21, 1962

3,049,809
METHOD OF DRYING FILAMENTARY MATERIAL
William N. Sellers, Pensacola, Fla., assignor to American Cyanamid Company, New York, N.Y., a corporation of Maine
Original application Feb. 13, 1956, Ser. No. 565,003, now Patent No. 2,931,107, dated Apr. 5, 1960. Divided and this application Sept. 18, 1959, Ser. No. 840,979
11 Claims. (Cl. 34—18)

This application is a division of my copending application Serial No. 565,003, filed February 13, 1956, now Patent No. 2,931,107, dated April 5, 1960.

The invention claimed in the aforementioned parent application relates broadly to apparatus for use in drying materials. More particularly, it is concerned with certain new and useful improvements in apparatus adapted for continuously drying a continuous length (that is, an indefinite length) of wet, flexible, elongated material under controlled humidity conditions. The apparatus of the invention is especially suitable for use in drying a wet, flexible, elongated, synthetic material, and particularly synthetic filamentary material such as that formed of a polymer of acrylonitrile. (The polymer of acrylonitrile may be either homopolymeric acrylonitrile or a copolymer of acrylonitrile containing a substantial proportion, e.g., at least 40%, by weight of acrylonitrile combined in the polymer molecule.)

The invention claimed in this divisional application is concerned with a new and useful improvement in a method of continuously drying continuous, unfabricated, gelled, filamentary material comprised of a polymer of acrylonitrile.

Various methods of producing synthetic or artificial fibers in continuous filament, tow and staple form heretofore have been suggested or are in use, and involve the use of apparatus of various designs. In general, such methods involve the production of filaments by either the so-called dry-spinning or wet-spinning methods. The present invention is concerned with a method that is especially useful in processing synthetic filamentary material in the form of continuous filaments (mono- or multifilaments) or tow (rope or bundle of continuous filaments) that has been produced by a wet-spinning operation.

In the wet-spinning method of producing synthetic filamentary material, e.g., polyacrylonitrile yarn or tow, a solution of the polyacrylonitrile is extruded through a perforated nozzle or jet, which is commonly known as a spinnerette, into a bath comprised of a liquid that will leach out the solvent from the polymer solution and in which the polymer is insoluble. As a result of thus extracting the solvent from the solution, the polymer is coagulated or precipitated from the solution. The coagulated yarn or filamentary material forms at the face of the spinnerette and is carried through the bath for a sufficient distance and at a rate such as will cause solidification of the coagulated filamentary polymer to the desired extent. Thereafter the coagulated yarn either with or without initial washing, e.g., with water, is subjected to a stretching operation, usually while it is still in a gel state, in order to increase the tenacity as well as otherwise to improve the physical properties of the filaments. This improvement in properties results from orientation, along the fiber axis, of the polymer molecules of which the filaments are comprised. The oriented filaments are then caused to pass through other treating or processing steps such as, for example, further washing, sometimes further stretching, drying, crimping, cutting into staple lengths, etc., or various permutations thereof.

The rapid and effective drying of certain synthetic filamentary materials produced by the wet-spinning technique, without detrimentally affecting the structure and useful properties of the filaments, heretofore has been a serious problem in the industry. This has been particularly true of wet-spun polyacrylonitrile filamentary materials, and especially those which have been coagulated in a bath comprised of, for example, water, water and ethanol or other lower aliphatic alcohol, water and certain water-soluble salts, or other aqueous compositions. In many cases when filaments produced in this manner were improperly dried, they had a relatively high degree of porosity, lacked the desired tensile strength and luster, and were unsatisfactory for the more important textile applications. A discussion of technical aspects of the matter will be found in, for example, Hare U.S. Patent No. 2,677,590 and Moody U.S. Patent No. 2,677,591, each dated May 4, 1954.

It is a primary object of the invention claimed in this divisional application to provide an improved method of continuously drying continuous, unfabricated, gelled, filamentary material comprised of a polymer of acrylonitrile.

The novel features of my invention are set forth in the appended claims. The invention itself, however, will best be understood from reference to the following more detailed description when considered in connection with the accompanying drawing, which is illustrative of a preferred embodiment of the invention, and wherein FIG. 1 is a front elevation of apparatus embodying the invention;

FIG. 2 is a sectional view taken along the line 2—2 of FIG. 1; and

FIG. 3 is a rear elevation of part of the apparatus shown in FIG. 1.

With reference to the drawing and especially to FIG. 1 thereof, there is shown by way of illustration apparatus that can be used in practicing the method of the invention and which includes at least one cabinet and, more particularly, as shown in FIG. 1, cabinets 10 (FIG. 1–A) and 12 (FIG. 1–B). Instead of having two cabinets as shown in FIG. 1 the apparatus may include any number of additional cabinets of similar construction, as desired or as may be required, for example, three, four, five or any higher number depending upon the particular wet, flexible, elongated material which is to be dried therein and the particular drying conditions required for the particular material.

In FIG. 1 cabinet 10 is shown with the front open so that the apparatus therein is exposed to view, while in cabinet 12 the front of the cabinet is shown as being closed.

Cabinet 10 contains a plurality of rolls 14 (feed-on roll), 16, 18, 20 (take-off roll), 22, 24 and 26 fitting within the cabinet and over which the wet, elongated material 28, e.g., a tow of polyacrylonitrile filamentary material in gel state, passes in an undulating path. The rolls within the cabinet are cantilevered, as is shown more clearly in FIG. 2 with respect to rolls 16 and 22, and are arranged in two banks as shown in cabinet 10. The upper bank 30 is comprised of the rolls 14, 16, 18 and 20 while the lower bank is comprised of the rolls 22, 24 and 26. Each of these two banks is spaced from the other and the rolls of each bank are spaced apart as shown in cabinet 10. The spacings between the rolls and between the banks of rolls are such as will provide optimum compactness of rolls within the individual cabinet that is consistent with optimum circulation of moist air through the cabinet and maximum ease of access to the individual rolls when "threading-up" or for inspection, adjustment, removal, etc. It will be understood by those skilled in the art that the rolls in all cases are adapted to be heated and to receive the elongated material.

It is not essential that the rolls shown in cabinet 10 be arranged in the particular manner there indicated or in the particular number shown by way of example. Thus, instead of having two banks of rolls as shown, in certain cases it may be desirable to have more than two banks, e.g., three, four or a higher number of banks and arranged in a different pattern. Likewise, it is not essential that the passage of the elongated material 28 be in the manner shown in FIG. 1–A since the cabinet may be differently positioned, e.g., vertically, and the elongated material passed downwardly over the banks of rolls. However, from the standpoint of ease of design, construction and accessibility of parts, it is preferred that the cabinets be positioned horizontal to the floor level; and that the rolls be arranged into two, staggered banks as shown in FIG. 1–A, namely: an upper bank containing an even number of rolls spaced equidistant from each other and a lower bank containing an odd number of rolls spaced the same distance from each other.

The cabinets 10 and 12 are each divided into two sections by a dividing wall, which in the case of cabinet 10 is the wall 34. The rolls are contained in the front section 36 while the driving mechanism for the rolls is in the rear section 38. The front section is closed, when the apparatus is in use, by the door 40 (FIG. 1–B) which is raisable as indicated and is provided with the transparent windows 42 for observing the operation during use of the apparatus. Cabinet 10 is provided with a similar raisable door, which is indicated in FIG. 1–A as being in a raised position. Suitable heat-insulation, e.g., asbestos, is provided on the cabinet doors, walls, etc., where and as may be required in order to keep heat losses to a minimum.

Any suitable means can be provided for driving the rolls in the cabinets at a desired peripheral speed. The rolls can be individually driven by motors at the same or different peripheral speeds as desired or as may be required; or, as is shown in FIG. 3, all of the rolls in a particular cabinet may be driven at the same peripheral speed by a chain and sprocket drive 44, which latter in turn is driven by a motor or other source of power. This arrangement makes it possible for all of the rolls in a particular cabinet to be driven at the same or different peripheral speeds from the rolls in the cabinet either before or after it in the series. For example, a continuous length of gelled filamentary material comprised of a polymer of acrylonitrile can be subjected to a desired tension (that is, it can be stretched to a desired degree) by operating all of the rolls in cabinet 12 at a predetermined higher peripheral speed than the rolls in cabinet 10. Or, if desired, the gelled filamentary material can be dried under substantially no tension or in a relaxed state by operating the rolls in a cabinet or cabinets at peripheral speeds that will accomplish this result. Progressive stretch and progressive relaxation within each cabinet of the apparatus can be effected by varying the number of teeth on each sprocket if a chain is used in transmitting power to the rolls, or by varying the number of teeth in each gear if gearing is used as a means of power transmission.

The walls of the cabinets 10 and 12 have openings therein for passing the elongated material 28 to the feed-on roll 14 and for removing it from the take-off roll 20. Such openings are indicated at 46 in the end wall 48 of the cabinet 10 and at 50 in the opposite end wall 52 of the same cabinet 10.

Jets or nozzles 54, 56 and 58 are disposed between the staggered banks of rolls and are so positioned that, when in use, high velocity air of controlled moisture content can be directed against the moving sections 60, 62, 64, 66, 68 and 70 of the elongated material 28 as the said sections pass between the roll banks 30 and 32.

Suitable means are provided for conducting high velocity air of controlled moisture content to the jets 54, 56 and 58 and for circulating it through the section 36 (FIG. 2) of the cabinet 10, and through the corresponding section of cabinet 12. Such means may take the form indicated generally by 72 in FIG. 3. In the arrangement there shown air is taken in through the inlet port 74 and the conduit 76 by means of the suction fan 78 which is driven through the shaft 80 by means of a motor (not shown). The incoming air then passes through the heated, finned section 82 and wherein it is heated by suitable means. Such means may take the form of one or more heating coils. As indicated in FIG. 3 two heating coils are employed, steam entering one coil through the inlet conduit 84 and leaving it through the outlet conduit 86; and entering the second heating coil through the inlet conduit 88 and leaving it through the outlet conduit 90. The heated air then continues its passage downwardly through the vertical extension or duct 92 and thence through the horizontal extension 94. Conduits 96, 98 and 100 in the horizontal extension or duct 94 are provided at their outer ends with suitable spray means, which may take the form of jets 54, 56 and 58 (FIG. 1–A).

After passing through the jets 54, 56 and 58 the hot, high-velocity air is drawn out of the section 36 through the exhaust manifold 102 by means of the fan 104 and thence through the conduits 106 and 108. The conduit 108 is provided at its bottom with a water drain 120 and a valve 122 for withdrawing such water as may accumulate in the bottom of the conduit. A damper 110 in the conduit 76 may be raised or lowered in order to permit a desired portion of the outgoing air to recirculate through the system and a desired amount of incoming air to be taken into the system.

In some cases the volatilization of the moisture from the material being dried and the rate of passage of the material over the drying rolls and through the unit will be sufficient to maintain the desired amount of moisture (humidity) in the high velocity air which is being circulated through the cabinet. A more uniform control of the humidity of the air which is being circulated through the cabinet is obtained by providing suitable means for introducing saturated steam into the cabinet in an amount such as will maintain the circulating air at the desired humidity, e.g., 10% to 50% relative humidity. One suitable means of effecting this result is by introducing saturated steam, e.g., at a temperature of 230°–350° F., through the conduit 112 into the vertical extension 92. A valve 114 in the conduit 112 is provided for introducing the desired amount of steam at the desired temperature into the circulating air stream. Any other suitable means of introducing the desired amount of water vapor to the vertical extension 92, or to any other portion of the air-circulating means 72 or of the section 36 of the cabinet may be employed.

The rolls in the individual cabinets may be heated by any situable means. For instance, they may be heated by electrical heating units within the rolls and adjacent the outer surfaces thereof or by means of steam, preferably superheated steam. In the latter case the rolls are hollow and the steam is introduced therein through a rotary joint which permits the steam to enter the roll through one conduit and be discharged through another one. In FIG. 2 the introduction of steam into the roll 14 is indicated by the inlet line 116 and its discharge from the roll by the line 117. Similarly, the line 118 indicates the introduction of steam into the roll 22, while the line 119 indicates its discharge from the said roll.

The temperature of the steam that is introduced into the rolls of the cabinets corresponds generally to the temperature wanted on the exterior surfaces of the rolls over which the elongated material being dried is passed. This surface temperature of the rolls can be varied considerably depending upon the particular material being dried, the moisture content thereof, the rate of drying desired, and other obvious influencing factors; but generally is at least 220° F. (dry-bulb) and may range upward to 400° F. (dry-bulb) or even higher in particular cases. For instance, in drying a gelled tow comprised of a polymer of acrylonitrile (e.g., a copolymer of about 95% acrylonitrile and about 5% methyl acrylate) and containing between about 90% and 120% by weight of water, based on the weight of the bone dry tow, the surface temperature of the rolls will generally be within the range of 230° F. to 350° F., more particularly 240°–280° F. (dry-bulb temperatures in all cases). The average dry-bulb temperature of the humid air within the cabinet is generally about 10°–40° F. below the surface temperature of the rolls.

The operation of the apparatus will be apparent to those skilled in the art from the foregoing description and the accompanying drawing. The elongated material to be dried can be passed through the apparatus at speeds ranging, for example, from 50 to 500 meters per minute depending, for instance, upon the particular material being dried and the number of rolls in the particular cabinet or series of cabinets.

The apparatus employed in practicing this invention is useful in continuously drying any wet, flexible, elongated material in a humid atmosphere, but finds its optimum utility in thusly drying synthetic filamentary material comprised of a polymer of acrylonitrile and which is in gelled state. The apparatus makes possible a high drying rate while at the same time providing, especially when drying a gelled polyacrylonitrile filamentary material, a fiber of improved, uniform structure that meets the requirements of the trade from the standpoint of tensile strength, luster and other useful properties. Such filamentary materials can be produced by the method and from the polyacrylonitriles described in, for instance, Cresswell U.S. Patent No. 2,558,730 dated July 3, 1951.

I claim:

1. A method of continuously drying continuous, unfabricated, wet-spun, gelled, filamentary material in untensioned state comprised of a polymer of acrylonitrile, said method comprising continuously passing said filamentary material alternately over and under heated, cylindrical surfaces arranged in series in a heat-insulated housing so as to provide an undulating path of travel for said filamentary material, the temperature of the said cylindrical surfaces being within the range of 220° F. (dry-bulb) to 400° F. (dry-bulb); directing high velocity humid air of controlled moisture content against the said filamentary material; and maintaining the humid air in the said heat-insulated housing at an average dry-bulb temperature of from about 10° F. to 40° F. below the temperature of the said cylindrical surfaces.

2. A method as in claim 1 wherein the filamentary material in untensioned state is filamentary material in relaxed state.

3. A method as in claim 1 wherein the continuous, unfabricated, wet-spun, gelled, filamentary material in untensioned state is a continuous, gelled tow comprised of a polymer of acrylonitrile and containing between about 90% and 120% by weight of water.

4. A method as in claim 1 wherein the temperature of the cylindrical surfaces is within the range of 230° F. (dry-bulb) to 350° F. (dry-bulb).

5. A method of continuously drying continuous, unfabricated, wet-spun, gelled, filamentary material in untensioned state comprised of a polymer of acrylonitrile, said method comprising continuously passing said filamentary material alternately over and under heated, driven, cantilevered rolls arranged in series in a heat-insulated housing so as to provide an undulating path of travel for said filamentary material, the surface temperature of the said rolls being within the range of 220° F. (dry-bulb) to 400° F. (dry-bulb); directing high velocity humid air of controlled moisture content into the included angle between the surface of one of said rolls and the approaching continuous filamentary material so that the said high velocity air is directed against the said filamentary material; and maintaining the humid air in the said heat-insulated housing at an average dry-bulb temperature of from about 10° F. to 40° F. below the surface temperature of the said heated rolls.

6. A method as in claim 5 wherein the polymer of acrylonitrile is a copolymer of about 95% acrylonitrile and about 5% methyl acrylate.

7. A method of continuously drying continuous, unfabricated, wet-spun, gelled, filamentary material in untensioned state comprised of a polymer of acrylonitrile, said method comprising continuously passing said filamentary material alternately over and under heated, driven, cantilevered rolls arranged in series in a heat-insulated housing so as to provide an undulating path of travel for said filamentary material, the surface temperature of the said rolls being within the range of 220° F. (dry-bulb) to 400° F. (dry-bulb); directing high velocity humid air of controlled moisture content into the included angle between the surface of one of said rolls and the approaching continuous filamentary material so that the said high velocity air is directed against the said filamentary material; circulating humid air through the said heat-insulating housing; and maintaining the humid air in the said heat-insulated housing at an average dry-bulb temperature of from about 10° F. to 40° F. below the surface temperature of the said heated rolls.

8. A method as in claim 7 wherein the surface temperature of the heated rolls is within the range of 240° F. (dry-bulb) to 280° F. (dry-bulb).

9. A method of continuously drying continuous, unfabricated, wet-spun, gelled, filamentary material in untensioned state comprised of a polymer of acrylonitrile, said method comprising continuously passing said filamentary material alternately over and under heated, driven, cantilevered rolls arranged in series in a heat-insulated housing so as to provide an undulating path of travel for said filamentary material, the surface temperature of the said rolls being within the range of 220° F. (dry-bulb) to 400° F. (dry-bulb); directing high velocity humid air of controlled moisture content into the included angle between the surface of one of said rolls and the approaching continuous filamentary material so that the said high velocity air is directed against the said filamentary material; circulating humid air through the said heat-insulated housing; controlling the uniformity of the humidity of the air which is being circulated through the said housing by introducing saturated steam thereto in an amount such as will maintain the circulating air at the desired humidity; and maintaining the humid air in the said heat-insulated housing at an average dry-bulb temperature of from about 10° F. to 40° F. below the surface temperature of the said heated rolls.

10. A method as in claim 9 wherein the filamentary material in untensioned state is filamentary material in relaxed state.

11. A method as in claim 9 wherein the amount of saturated steam which is introduced into the heat-insulated housing is such as will maintain the circulating air at from 10% to 50% relative humidity.

References Cited in the file of this patent

UNITED STATES PATENTS

| | | |
|---|---|---|
| 2,260,501 | Wynd | Oct. 28, 1941 |
| 2,344,686 | Fanselow | Mar. 21, 1944 |